United States Patent [15] 3,686,280
Rave [45] Aug. 22, 1972

[54] PROCESS OF PREPARING ALIPHATIC MONOFUNCTIONAL OXIMES

[72] Inventor: Terence W. Rave, Wilmington, Del.

[73] Assignee: Hercules Incorporated, Wilmington, Del.

[22] Filed: Oct. 29, 1970

[21] Appl. No.: 85,299

[52] U.S. Cl. ........260/482 R, 260/534 R, 260/544 Y
[51] Int. Cl. ............................................C07c 131/00
[58] Field of Search...........260/482 R, 534 M, 534 R

[56] References Cited

OTHER PUBLICATIONS

Beckham, L. J. et al., Chem. Rev. 48, pp. 356– 358 (1951).
Ogloblin, K. A. et al., Chem. Abstracts, Vol. 64, 3343 (1966).

*Primary Examiner*—Lorraine A. Weinberger
*Assistant Examiner*—Paul J. Killos
*Attorney*—John W. Whitson

[57] ABSTRACT

Disclosed is a novel process for the preparation of oximes and hydroximoyl halides, comprising reacting nitrosyl chloride with ketene in an essentially 1:1 molar ratio at a temperature below about 50° C. and then adding water or an aliphatic alcohol in excess of that required to convert the intermediate to an oxime having the general formula HON  $CHCO_2R$ where R is hydrogen or an aliphatic radical. The oxime can be treated with a halogen to prepare a hydroximoyl halide having the general formula

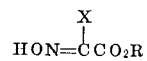
$$HON=\overset{X}{\underset{|}{C}}CO_2R$$

where R is as defined above and X is chlorine, bromine or iodine.

8 Claims, No Drawings

PROCESS OF PREPARING ALIPHATIC MONOFUNCTIONAL OXIMES

This invention relates to a novel process of preparing aliphatic monofunctional oximes and hydroximoyl halides.

Various methods for the preparation of oximes and hydroximoyl chlorides have been reported in the art. The method most often reported is the treatment of an aldehyde with hydroxylamine to produce an oxime which can be converted to a hydroximoyl chloride by reacting with chlorine. However, the prior art methods suffer from the disadvantages of low yields and expensive reactants.

It has now been found that by treating ketene with nitrosyl chloride and then treating the resulting intermediate with an aliphatic alcohol or water, oximes can be prepared inexpensively and in good yields. By the term "good yields" is meant a yield of at least 40 percent of theoretical. Preferred reaction conditions are as follows: (1) the reaction should be conducted at a low temperature, i.e., below a temperature of about 50° C., (2) the nitrosyl chloride should be added to the ketene rather than vice-versa, (3) an approximately 1:1 stoichiometric ratio of ketene to nitrosyl chloride should be maintained, (4) an excess of the aliphatic alcohol or water, i.e., at least about 1.5 times the stoichiometric amount required, should be used. The resulting oxime can then be converted to a hydroximoyl halide by reacting with a halogen.

The general reaction for the preparation of the oximes can be shown in the following equations:

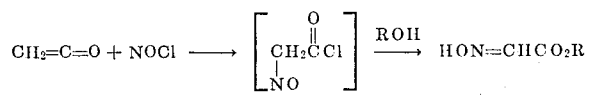

wherein R is hydrogen or an aliphatic radical. The general reaction for the preparation of the hydroximoyl halides can be shown in the following equations:

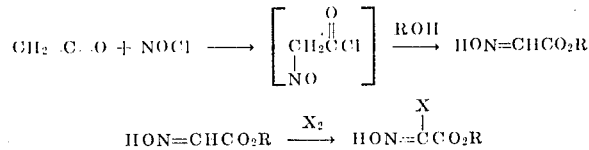

wherein R is defined as above and X is a halogen, selected from the group of chlorine, bromine and iodine.

Aliphatic monohydroxyl alcohols and water are most preferred in the preparation of the oximes and hydroximoyl halides in accordance with this invention. The term "aliphatic monohydroxyl alcohol", as used throughout this application, refers to an alcohol where the single hydroxyl group is attached to an aliphatic carbon atom. Typical aliphatic alcohols are the alkyl alcohols such as methyl alcohol, ethyl alcohol, n-propyl alcohol, isopropyl alcohol, n-butyl alcohol, isobutyl alcohol, tert. butyl alcohol, n-heptyl alcohol, 2-methylhexanol-1, 3-ethyl-pentanol-2, n-decyl alcohol, and the like; the cycloalkyl alcohols such as cycloheptanol, cyclohexanol, and the like; the hydroxyalkyl cycloalkanes such as hydroxymethylcycloheptane, 2-hydroxyethylcyclohexane, 3-hydroxypropylcycloheptane, 2-hydroxypropylcyclohexane, and the like; the hydroxyalkyl aromatics such as hydroxymethylbenzene, 2-hydroxyethylbenzene, 4-hydroxybutylbenzene, 3-hydroxybutylbenzene, and the like. In addition to the above, certain aliphatic monohydroxyl alcohols substituted with halogen radicals, alkoxy radicals and carboalkoxy radicals as well as glycols and monoesters of glycols can also be used.

As indicated above, the process of this invention comprises the reaction of ketene with nitrosyl chloride followed by treatment with excess aliphatic alcohol or water to prepare an oxime and then, if desired, reacting the resulting oxime with a halogen to produce the hydroximoyl halide. This process can be conducted in any manner, following the general procedure outlined above.

For example, the ketene can be reacted with the nitrosyl chloride in a mutual solvent at a temperature in the range of from about 50° to −100° C., preferably from 30° to about −80° C. (both ketene and nitrosyl chloride are gaseous at room temperature and tend to react violently if mixed in large amounts at higher temperatures). Any solvent which is a solvent for ketene, nitrosyl chloride and the aliphatic alcohol or water can be used in the process of this invention. Typical solvents for ketene, nitrosyl chloride and aliphatic alcohols are the halogenated hydrocarbons, particularly the chlorinated hydrocarbons such as methylene chloride, chloroform, carbon tetrachloride, ethylene dichloride, dichlorobenzene, trichlorobenzene and the like; the aliphatic ethers such as dimethyl ether, diethyl ether, diisopropyl ether, ethylene glycol dimethyl ether, diethyl glycol dimethyl ether, and the like; cyclic aliphatic ethers such as tetrahydrofuran, dioxane, and the like; the aromatic hydrocarbons such as benzene, toluene, xylene, naphthalene, and the like and mixtures of two or more of the above solvents. If water is used in place of the aliphatic alcohol the solvent must be one in which water is soluble, e.g., tetrahydrofuran, dioxane, diethylene glycol dimethyl ether, and the like.

In accordance with another modification of this invention gaseous ketene and nitrosyl chloride can be continuously reacted, most preferably at a temperature of from about −6° to 50° C. in a rapid-mixing device and then rapidly quenched by injection of a stream of alcohol. If desired the two gases (i.e. ketene and nitrosyl chloride) can be diluted with some inert gas such as nitrogen.

As stated above the nitrosyl chloride should be added to the ketene rather than vice-versa if good yields are to be obtained. In addition, a 1:1 stoichiometry of nitrosyl chloride to ketene must be maintained as closely as possible since an excess of either the nitrosyl warmed reactant can destroy the intermediate. In general, the ketene will be dissolved in a solvent and then the nitrosyl chloride added. The nitrosyl chloride can either be added in the form of a gas or a liquid. For example, it can be bubbled into the chilled solution of ketene, or it can first be dissolved in a solvent and then added, or it can be cooled below −5.5° C., where it becomes a liquid, and then added in this form. In any event, the nitrosyl chloride will be added to the ketene in an approximately 1:1 molar ratio. Following this initial reaction the aliphatic alcohol or water will be added. As stated above, they must be added in an excess if good yields are to be obtained. An amount of alcohol or water in the range of from about 1.5 to about 30, more preferably from about 2 to about 20, times that theoretically required will be used. Following the addition of the alcohol or water, the solution may be warmed if desired. If an oxime is the desired end product, it can be removed at this time by stripping the solvent. If a hydroximoyl halide is desired, a halogen will be added to the solution in a sufficient amount to convert the oxime to the hydroximoyl halide. In general, an excess of halogen of from about 1.5 equivalents to about 3.0 will be used. Most preferably, the oxime solution will be cooled to a temperature below about 0° C. and the halogen added by bubbling through the solution, in the case of chlorine, or simply poured in, in the case of bromine, or dissolved in a solvent, in the case of iodine. Following the addition of the halogen the hydroximoyl halide product can be discovered by stripping off the solvent. The oximes and hydroximoyl halides are stable liquids or crystalline solids at room temperature depending upon the R radical of the ester group.

The following examples will serve to illustrate the invention. All parts and percentages being by weight unless otherwise indicated.

EXAMPLE 1

This example illustrates the preparation of ethyl oximinoglyoxylate.

To approximately 270 parts of dry methylene chloride, under an atmosphere of nitrogen and cooled to approximately −78° C., is added 0.8 parts (19.2 mmoles) of ketene by bubbling ketene gas slowly into the solvent over a 30 minute period. To the resulting solution of ketene is methylene chloride is added 1.26 parts (19.2 mmoles) of nitrosyl chloride. The nitrosyl chloride is also bubbled into the solution. Then 23 parts (500 mmoles) of dry ethyl alcohol is added with agitation. The agitation is continued as the solution is allowed to comer to room temperature and then for 48 hours additional time. The solvent is then evaporated yielding 2.15 parts of a yellow oil containing ethyl oximinoglyoxylate in a yield of approximately 67 percent. An infrared spectrum of the product is identical to that of an authenticated sample of ethyl oximinoglyoxylate.

EXAMPLE 2

This example illustrates the preparation of ethyl chloroximinoglyoxylate.

To approximately 160 parts of methylene chloride, under an atmosphere of nitrogen and cooled to approximately −78°C., is added 1.67 parts (39.9 mmoles) of ketene gas. Then 2.54 parts (39 mmoles) of nitrosyl chloride gas is bubbled into the solution. After five minutes 3.95 parts (76 mmoles) of dry ethyl alcohol is added with agitation. After a period of 15 minutes 5.68 parts (80 mmoles) of chlorine gas is bubbled in. The resulting yellow solution is stirred one hour in the cold and then overnight at room temperature. Evaporation of the solvent yields approximately 3.54 parts of a yellow crystalline solid (60 percent yield). The resulting product has an infrared spectrum identical to that of an authenticated sample of ethyl chloroximinoglyoxylate and a melting point of 76–79° C.

EXAMPLE 3

This example illustrates the preparation of n-butyl oximinoglyoxylate.

Ketene is dissolved in methylene chloride and reacted with nitrosyl chloride, in a ratio of 19.8 mmoles:19.8 mmoles exactly as described in Example 1. To the resulting reaction mixture is added 14.65 parts (198 mmoles) of dry n-butyl alcohol. The resulting solution is stirred for three hours in the cold and then for 48 hours at room temperature. Evaporation of the solvent yields 19.13 parts of a yellow liquid containing n-butyl oximinoglyoxylate having an infrared spectrum essentially identical to that of an authenticated sample of n-butyl oximinoglyoxylate. The yield of 70 percent theoretical, as determined by gas chromatographic analysis.

EXAMPLE 4

This examples illustrates the preparation of n-butyl chloroximinoglyoxylate.

To approximately 65 parts of methylene chloride is added 0.92 parts (6.35 mmoles) of the n-butyl oximinoglyoxylate of Example 3. The reaction vessel is flushed with nitrogen and then cooled in a dry ice-acetone bath to a temperature of approximately −78° C. Then chlorine gas is introduced below the surface of the methylene chloride solution in an amount of 0.90 parts (12.7 mmoles). The resulting greenish blue solution is agitated for three hours in the cold and then at room temperature for 48 hours. The solvent is evaporated to yield 1.132 parts of a white solid, having a melting point of 56°–58° C. and an infrared spectrum identical to that of n-butyl chloroximinoglyoxylate. The yield from the reaction is 85 percent of theoretical.

EXAMPLE 5

This example illustrates the preparation of methyl oximinoglyoxylate.

To approximately 330 parts of methylene chloride, under an atmosphere of nitrogen and cooled to approximately −78° C., is added 3.04 parts (72 mmoles) of ketene gas. To the resulting solution is added 4.74 parts (72 mmoles) of nitrosyl chloride gas. Then 23.0 (720 mmoles) of dry methyl alcohol is added with stirring. The reaction mixture is stirred for two hours in the cold and then for 12 hours at room temperature. Evaporation of the solvent yields a yellow oil which slowly crystallizes to give 4.9 parts of a pale yellow solid. Sublimation gives a white solid having a melting point of 53°–55° C. and an infrared spectrum identical to methyl oximinoglyoxylate. The yield is 66 percent of theoretical.

EXAMPLE 6

This example illustrated the preparation of oximinoglyoxylic acid.

To approximately 220 parts of tetrahydrofuran under an atmosphere of nitrogen and cooled to approximately −78° C., is added 3.32 parts (79.2 mmoles) of ketene gas. To the resulting solution is added 5.18 parts (79.2 mmoles) of nitrosyl chloride gas. Then 18 parts (1,000 mmoles) of water is added with stirring. The resulting slushy mixture is stirred for one hour in the cold and then for 12 hours at room temperature. Evaporation of the solvent yields a liquid which on standing under a stream of nitrogen solidifies to an orange solid. After recrystallization, the yield is 4.73 parts of light tan crystals (68 percent of theoretical) having an infrared spectrum identical to oximinoglyoxylic acid.

A sample of the oximinoglyoxylic acid is converted to chloroximinoglyoxylic acid by dissolving in dry ethyl ether, cooling to 0° C. and bubbling in an excess of chlorine gas. The chlorinated product is a white solid having a melting point of 134°–135° C.

EXAMPLE 7

This example illustrates the preparation of cyclohexyl oximinoglyoxylate.

To approximately 300 parts of methylene chloride, under an atmosphere of nitrogen and cooled to approximately −78° C., is added 4.2 parts (100 mmoles) of ketene gas. To the resulting solution is added 6.55 parts (100 mmoles) of nitrosyl chloride gas. Then 100 parts (1,000 mmoles) of cyclohexanol is added with stirring. The reaction mixture is stirred for two hours in the cold and then for 12 hours at room temperature. Evaporation of the solvent results in a good yield of cyclohexyl oximinoglyoxylate.

EXAMPLE 8

This examples illustrates the preparation of phenethyl oximinoglyoxylate.

To approximately 200 parts of methylene chloride, under an atmosphere of nitrogen and cooled to approximately −78° C., is added 2.1 parts (50 mmoles) of ketene gas. To the resulting solution is added 3.27 parts (50 mmoles) of nitrosyl chloride gas. Then 61 parts (500 mmoles) of hydroxyethyl benzene is added with stirring. The reaction mixture is stirred for two hours in the cold and then overnight at room temperature. Evaporation of the solvent results in a good yield of phenethyl oximinoglyoxylate.

What I claim and desire to protect by Letters Patent is:

1. A process for the preparation of an oxime having the general formula $HON = CHCO_2R$ where R is hydrogen or an aliphatic radical, which comprises reacting nitrosyl chloride with ketene in an essentially 1:1 molar ratio at a temperature below about 50° C. and then adding water or an aliphatic monohydroxyl alcohol in excess of that required to convert the intermediate to an oxime.

2. The process of claim 1 wherein R is hydrogen and water is added to convert the intermediate to an oxime.

3. The process of claim 1 wherein R is an alkyl radical and an aliphatic alcohol is added to convert the intermediate to an oxime.

4. The process of claim 3 wherein the alkyl radical is a methyl radical and the aliphatic alcohol is methanol.

5. The process of claim 3 wherein the alkyl radical is an ethyl radical and the aliphatic alcohol is ethanol.

6. The process of claim 3 wherein the alkyl radical is an n-butyl radical and the aliphatic alcohol is n-butyl alcohol.

7. A process for the preparation of a hydroximoyl halide having the general formula

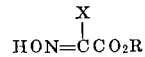

where R is hydrogen or an aliphatic radical and X is a halide, which comprises reacting nitrosyl chloride with ketene in an essentially 1:1 molar ratio at a temperature below about 50° C., then adding water or an aliphatic monohydroxyl alcohol in excess of that required to convert the resulting intermediate to an oxime and contacting the resulting oxime with a sufficient amount of a halogen to convert the oxime to a hydroximoyl halide.

8. The process of claim 7 wherein chloroximinoglyoxylic acid is prepared by adding water to the intermediate and contacting the resulting oximinoglyoxylic acid with chlorine.

* * * * *

PO-1050
(5/69)

UNITED STATES PATENT OFFICE
CERTIFICATE OF CORRECTION

Patent No. 3,686,280                    Dated August 22, 1972

Inventor(s)  Terence W. Rave (Case 2)

It is certified that error appears in the above-identified patent and that said Letters Patent are hereby corrected as shown below:

In the Abstract of Disclosure, line 7,
" HON CHCO$_2$R " should read -- HON=CHCO$_2$R --.

Column 2, line 56, omit " the nitrosyl warmed ".

Column 3, line 37, " is " should read -- in --.

Signed and sealed this 9th day of January 1973.

(SEAL)
Attest:

EDWARD M. FLETCHER, JR.                ROBERT GOTTSCHALK
Attesting Officer                      Commissioner of Patents